(12) United States Patent
Studnicka et al.

(10) Patent No.: US 11,119,005 B2
(45) Date of Patent: Sep. 14, 2021

(54) GRADING A PISTON WITH DEPOSITS USING MEASUREMENT DATA AND THERMAL SCAN DATA

(71) Applicant: Caterpillar Inc., Peoria, IL (US)

(72) Inventors: Seth C. Studnicka, Chillicothe, IL (US); Christopher S. Meeks, Morton, IL (US); Nien L. Lee, Peoria, IL (US); Michael S. Radovanovic, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 110 days.

(21) Appl. No.: 16/671,679

(22) Filed: Nov. 1, 2019

(65) Prior Publication Data
US 2021/0131913 A1    May 6, 2021

(51) Int. Cl.
*G01M 15/04* (2006.01)
*G06K 9/00* (2006.01)

(52) U.S. Cl.
CPC ....... *G01M 15/042* (2013.01); *G06K 9/00214* (2013.01); *G06T 2207/30164* (2013.01)

(58) Field of Classification Search
None
See application file for complete search history.

(56) References Cited

U.S. PATENT DOCUMENTS

| | | | |
|---|---|---|---|
| 6,595,684 B1 * | 7/2003 | Casagrande | G01N 25/72 374/4 |
| 7,637,251 B2 | 12/2009 | Kuo et al. | |
| 8,204,294 B2 | 6/2012 | Alloo et al. | |
| 9,400,256 B2 | 7/2016 | Henderkott et al. | |
| 9,519,844 B1 | 12/2016 | Thompson et al. | |
| 9,957,887 B2 | 5/2018 | Roe et al. | |
| 2014/0136085 A1 | 5/2014 | Martin et al. | |
| 2017/0145899 A1 * | 5/2017 | Singh | F02B 23/0675 |

FOREIGN PATENT DOCUMENTS

JP    6385438 A    4/1988

* cited by examiner

*Primary Examiner* — John C Kuan
(74) *Attorney, Agent, or Firm* — Procopio, Cory, Hargreaves & Savitch

(57) ABSTRACT

A method and system for grading pistons with deposits is disclosed. In an embodiment, a piston with upon its outer surface deposits is three dimensionally scanned and compared to a reference model to detect the location and geometry of the deposits. The location and geometry of the deposits are recorded and used to grade the pistons. The piston is increased in temperature and thermally scanned. The deposits are identified based on the temperature differences measured with respect to the temperature of the outer surface of the piston. Deposit characteristics can be generated from the identified locations of deposits and the magnitude of temperature difference with respect to the outer surface. The deposit characteristics are recorded and used to grade the pistons.

20 Claims, 3 Drawing Sheets

GRADING A PISTON WITH DEPOSITS USING MEASUREMENT DATA AND THERMAL SCAN DATA

TECHNICAL FIELD

The present disclosure generally pertains to a piston, and is directed towards grading a piston with deposits using measurement data and thermal scan data.

BACKGROUND

Systems employing hydrocarbon fuels can accumulate deposits on the surfaces of pistons. One of the commonly used methods for rating engines examination of a test piston which has been subjected to many hours of operation in a running engine. Engine design can be evaluated, in part, by visually assessing the amount of material which has been deposited on piston surfaces and in piston ring grooves. Currently, this evaluation procedure is done manually, using human visual assessment to classify the deposit color and coverage.

U.S. Pat. No. 9,957,887 to Roe et. al. describes a machine comprising a piston, a memory, and an electronic control module. The electronic control module configured to determine a temperature of a bowl rim of the piston. The electric control module further configured to calculate a temperature of an oil gallery of the piston based on the temperature of the bowl rim. The electric control module further configured to determine a carbon deposit growth rate of the piston based on the temperature of the oil gallery. The electric control module further configured to determine an amount of time between a current time and the time when the previous carbon deposit growth was calculated. The electric control module further configured to calculate a current carbon deposit growth on the piston and take a remedial action based on the current carbon deposit growth. The current carbon deposit growth is calculated based on: a previous carbon deposit growth on the piston, an amount of time between a current time and a time when the previous carbon deposit growth was calculated, and the carbon deposit growth rate.

The present disclosure is directed toward improvements in the art.

SUMMARY

A system and method of grading machined parts with deposits upon the outer surface are disclosed herein. In embodiments, a method of grading pistons includes performing a first three dimensional scan of the piston in a first state. The method further includes creating a first three dimensional piston model from the first three dimensional scan of the piston in the first state. The method further includes performing a second three dimensional scan of the piston in a second state. The method further includes creating a second three dimensional piston model from the second three dimensional scan of the piston in the second state. The method further includes comparing the second three dimensional piston model to the first three dimensional piston model to identify one or more deposits upon the outer surface. The method further includes generating measurement data for each of the one or more deposits. The method further includes increasing the temperature of the piston. The method further includes performing a thermal scan of the outer surface of the piston and any deposits there on. The method further includes generating thermal scan data from the thermal scan representing temperatures at a plurality of locations upon the outer surface of the piston. The method further includes identifying deposit locations from the temperatures at the plurality of locations upon the outer surface of the piston by identifying temperature differences with respect to a temperature of the outer surface of the piston. The method further includes generating deposit characteristics from the deposit locations and magnitude of temperature differences with respect to the temperature of the outer surface of the piston. The method further includes grading the piston with regard to the measurement data and the deposit characteristics.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. In some instances, well-known structures and components are shown in simplified form for brevity of description.

Figure 1:
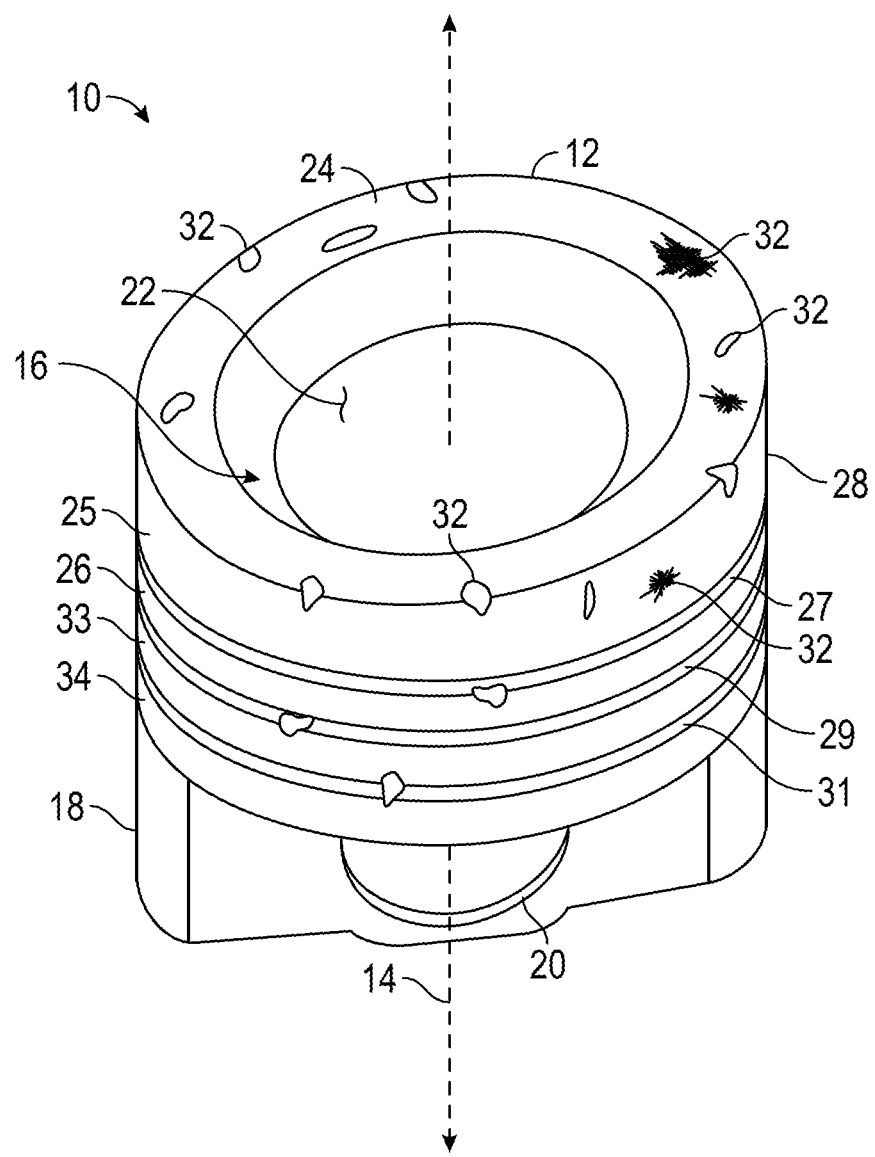
FIG. 1 is a schematic illustration of an exemplary piston with deposits.

FIG. 1 is schematic illustration of an exemplary piston with deposits. FIG. 1 includes a piston 10 with a piston body 12 after being in use within an internal combustion engine for a period of time. Piston body 12 includes a piston combustion surface 16 (the upper surface) and a piston skirt 18 (the lower portion) and defines a longitudinal axis 14. A wrist pin bore 20 extending normal to axis 14 is formed in skirt 18 and configured to receive a wrist pin for coupling piston body 12 with a piston rod in a conventional manner. A combustion bowl 22 is formed into the piston 10 and is surrounded by an annular rim 24 circumferential of axis 14. In other embodiments the piston 10 can have other configurations such as having a flat top or domed portion instead of a combustion bowl 22 and annular rim 24. A plurality of piston ring grooves including a first groove 27 (sometimes referred to as a top piston groove) a second groove 29, and a third groove 31 are formed in an outer surface 28 of piston body 12, and also extend circumferentially around longitudinal axis 14. The outer surface 28 may include a first land 25 (sometimes referred to as a top land) a second land 26, a third land 33, and a fourth land 34. The first land 25, the second land 26, the third land 33, and the fourth land 34 may be axially spaced apart from each other along the longitudinal axis 14 and can be separated by the plurality of piston ring grooves.

The first land 25 may be positioned adjacent to the combustion surface 16. In an embodiment the first land 25 can be disposed closer to the combustion surface 16 than the second land 26. The third land 33 may be positioned between the second land 26 and the fourth land 34. The fourth land 34 may be positioned furthest from the combustion surface 16. The first groove 27 may be positioned between the first land 25 and the second land 26. The first groove 27 may be disposed closer to the first land 25 than the second groove 29 and the third groove 31. The third groove 31 may be positioned between the third land 33 and the fourth land 34. The third groove 31 may be positioned further from the combustion surface 16 than the first groove 27 and the second groove 29. The piston body 12 may be formed of a base material such as steel or aluminum used in originally manufacturing the piston.

After operating within an internal combustion engine for a period of time, the piston 10 may acquire deposits 32. The deposits 32 can be located on the outer surface 28 and combustion surface 16 of the piston 10. Deposits 32 may include for example, a buildup of carbon. The deposits 32 in some instances might be deposits of foreign material on the piston body 12, or still another feature.

Figure 2:
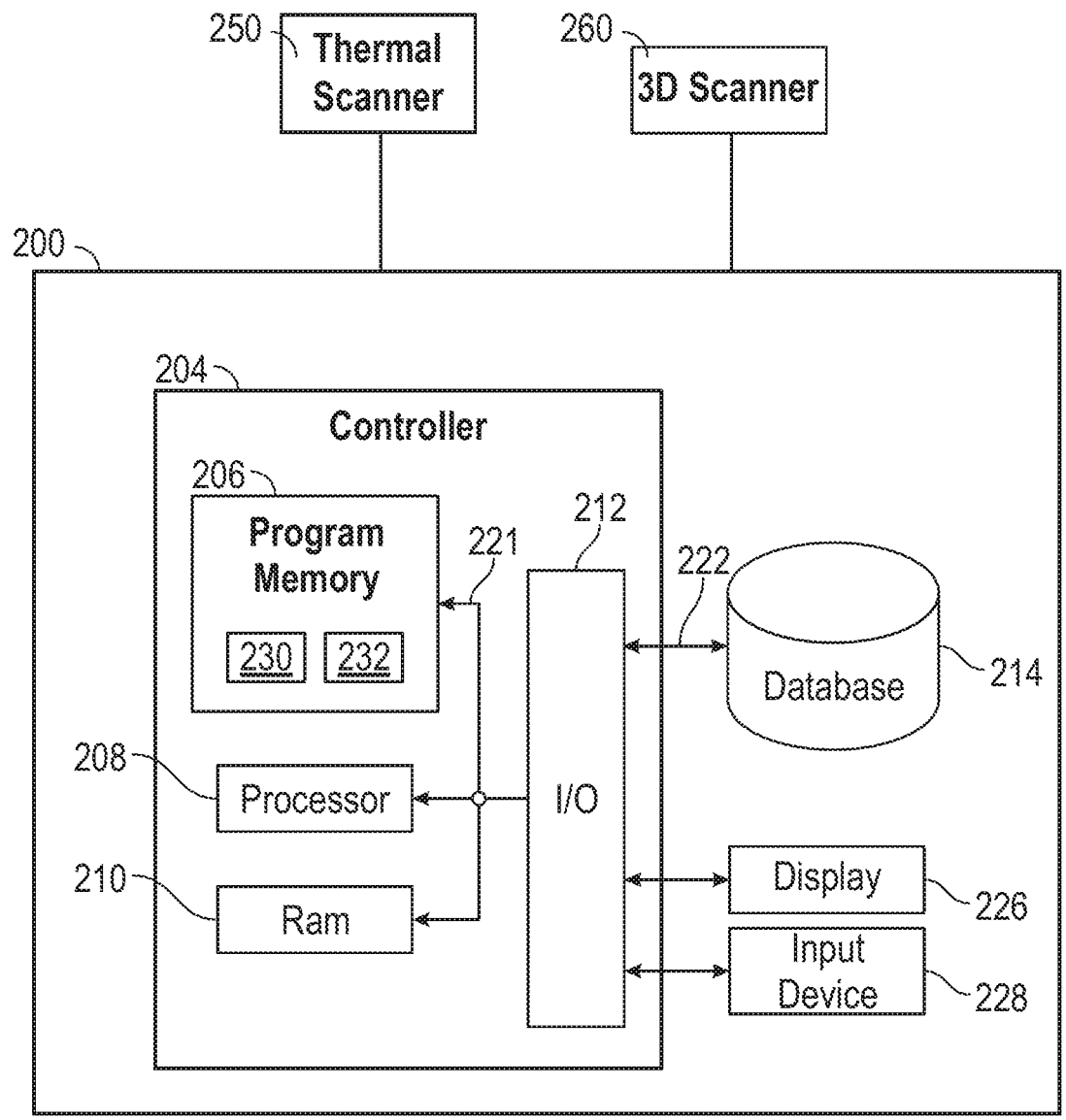
FIG. 2 is a functional block diagram of a computer system.

FIG. 2 is a functional block diagram of a computer system 200. In certain embodiments, the computer system 200, sometimes referred to as a piston grading system, is in communication with a thermal scanner 250 (sometimes referred to as a thermal camera) and a three dimensional (3D) scanner 260. In other examples the thermal scanner 250 and the 3D scanner 260 can each include a computer such as the computer system 200. The thermal scanner 250 can be a thermal scanner that captures temperature information. The thermal scanner 250 can be a Fluke Ti45 camera. The 3D scanner 260 can be an optical or laser scanner that captures spatial information. In an example, the 3D scanner 260 can be a smartphone configured to capture images and data that can be referenced to create a 3D model. The 3D scanner 260 can comprise other equipment capable of capturing dimensions and spatial information of an object such as a piston 10.

The computer system 200 may have a controller 204 operatively connected to a database 214 via a link 222 connected to an input/output (I/O) circuit 212. It should be noted that, while not shown, additional databases 214 may be linked to the controller 204 in a known manner. Furthermore, these databases 214 may be external to the computer system 200.

The controller 204 can include a program memory 206, the processor 208 (may be called a microcontroller or a microprocessor), a random-access memory (RAM) 210, and the input/output (I/O) circuit 212, all of which are interconnected via an address/data bus 221. It should be appreciated that although only one microprocessor 208 is shown, the controller 204 may include multiple microprocessors 208. Similarly, the memory of the controller 204 may include multiple RAMS 210 and multiple program memories 206. Although the I/O circuit 212 is shown as a single block, it should be appreciated that the I/O circuit 212 may include a number of different types of I/O circuits. The RAM(s) 210 and the program memories 206 may be implemented as semiconductor memories, magnetically readable memories, nonvolatile memories, and/or optically readable memories, for example.

The program memory 206 and RAM 210 can be a non-transitory computer-readable medium having stored thereon computer-executable code (e.g., disclosed software or subroutines) and/or data. The program memory 206 and/or the RAM 210 may store various applications (i.e., machine readable instructions) for execution by the microprocessor 208. For example, an operating system 230 may generally control the operation of the computer system 200 and provide a computing environment to implement the processes described herein. The program memory 206 and/or the RAM 210 may also store a variety of software 232 for accessing specific functions of the computer system 200. In addition to the controller 204, the computer system 200 may include other hardware resources. The computer system 200 may also include various types of input/output hardware such as the visual display 226 and input device(s) 228 (e.g., keypad, keyboard, mouse, etc.). In an embodiment, the display 226 can be touch-sensitive, and may cooperate with a software keyboard routine as part of the software 232 to accept user input. The software 232 may implement other functions, for example, implementing software keyboard functionality, interfacing with other hardware in the computer system 200, etc.

The display 226 can display user input fields through a graphical user interface. The input fields of the graphical user interface can accept information related to deposit dimensions and other information inputted by a user interacting with the input device 228.

The software 232 may include code to execute any of the operations described herein. The program memory 206 and/or the RAM 210 may further store data related to the configuration and/or operation of the computer system 200, and/or related to the operation of the software 232.

INDUSTRIAL APPLICABILITY

During product evaluation and product development, for example a newly designed piece of machinery, new pistons 10 can be installed into the machinery and operated for a specified amount of testing time to assess deposit buildup. In other examples the deposit build up is evaluated to evaluate various operating characteristics, engine settings, fuel rates, fuel patterns, and other characteristics of operating machinery. In some examples the deposits 32 comprise carbon.

After the testing time has been reached the dirty pistons can be removed from the machinery and assessed for deposit buildup to determine if the machinery operating characteristics are acceptable or not acceptable.

Pistons with deposits are typically visually assessed per industry standards such as American Society for Testing and Materials (ASTM) standards. Any visual assessment can be prone to low accuracy and precision and be subjected to personal bias. For example, differences in visual assessments may vary from day to day from the same viewer and from person to person. Additionally, the visual assessment has no inherent relation to scientific quantities such as mass, volume, etc. This disconnect to scientific quantities causes simulation of the piston deposit issue to be difficult.

A method that grades pistons based on measurement and other quantifiable data can decrease the grading time for each piston 10, reduce cost, and improve consistency of which pistons 10 are considered acceptable and which are considered not acceptable. In some examples the method is automated and can provide additional cost savings. By using the method disclosed herein, measurements such as thickness and other deposit characteristics can be captured without the need to cut a piston in half to utilize measuring devices that only provide two dimensional measurements.

Figure 3:
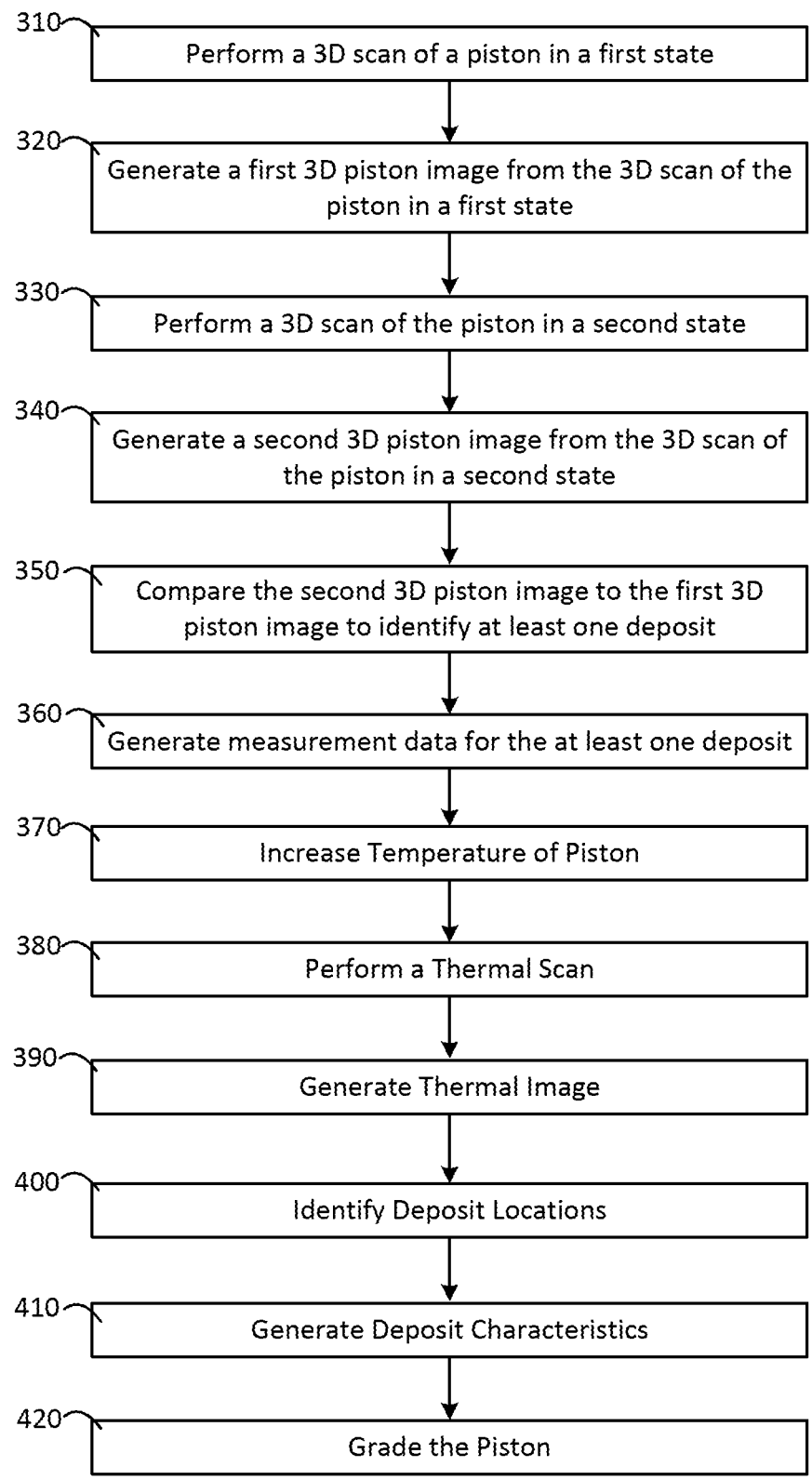
FIG. 3 is a flowchart of a method for grading a piston with deposits.

FIG. 3 is a flowchart of a method for grading pistons with deposits. The method begins at block 310 and can include performing a first three dimensional (3D) scan (sometimes referred to as a three dimensional scan) of the piston 10 with the 3D scanner 260. The piston 10 may be in a first state or clean/new condition. For example the first state of the piston 10 may be prior to using the piston 10 with machinery. In other embodiments the piston 10 can represent a different engine component or machined component, and can be scanned and graded in a similar fashion to the piston 10. The 3D scan can be performed by a 3D scanner 260, which may include a computer system 200. The scanning process can measure over one million points on the outer surface 28 of the piston 10 in a first state. The 3D scanner 260 can transmit the 3D scan information/data relating to the piston 10 in the first state to the computer system 200. In other words, the computer system 200 receives the three dimensional scan of the piston 10 in the first state. In examples multiple scans can be performed and scans can be taken at different angles and rotations. A developer spray can be applied to the piston 10 prior to the 3D scan to reduce the reflectivity of the piston 10. The developer spray can produce an opaque, white coating that minimizes the piston's reflectivity and improves accuracy of 3D scan information generated from the 3D scan.

At block 320 a first 3D piston model (sometimes referred to as a 3D image) can be generated from the first 3D scan of the piston 10 in a first state. The computer system 200 can generate the first 3D piston model from the 3D scan information sent from the 3D scanner 260. In an embodiment, the software of the computer system 200 can generate the first 3D piston model from the 3D scan information sent from the 3D scanner 260.

At block 330 a second 3D scan of the piston 10 can be performed by the 3D scanner 260. The piston 10 may be in a second state or dirty/used condition. For example, a piston in a first state or a new piston can be installed into machinery and use in operation of the machinery for a given amount of testing time. After the testing operation, the piston 10 is removed and can be in a second state or dirty condition. The second 3D scan can be performed by the 3D scanner 260, which may include a computer system 200. The scanning process can measure over one million points on the outer surface 28 of the piston 10 in a first state. The 3D scanner 260 can transmit the second 3D scan information relating to the piston 10 in a second state to the computer system 200. In other words, the computer system 200 receives the second three dimensional scan of the piston 10 in a second state. In examples multiple scans can be performed and scans can be taken at different angles and rotations. A developer spray can be applied to the piston 10 in a second state prior to the second 3D scan to reduce the reflectivity of the piston 10. The developer spray can produce an opaque, white coating that minimizes the piston's reflectivity and improves accuracy of 3D scan information generated from the 3D scan.

At block 340 a second 3D piston model (sometimes referred to as piston image) can be generated from the second 3D scan of the piston 10 in a second state. The computer system 200 can generate the second 3D piston model from the second 3D scan information sent from the 3D scanner 260. In an embodiment, the software of the computer system 200 can generate the second 3D piston model from the second 3D scan information sent from the 3D scanner 260. In other embodiments the 3D scanner 260 generates the second 3D piston model.

At block 350 the second 3D piston model can be compared to the first 3D piston model to identify deposits 32. In this embodiment the first 3D piston model can also be referred to as the reference model. The computer system 200 can compare the second 3D piston model to a first 3D piston model to identify one or more deposits 32. The differences between the first 3D piston model and 3D piston model can represent locations and geometry of deposits 32 on the piston. In other words, the computer system 200 can generate a deposit thickness by subtracting the dimensions of the piston 10 in the second state from the piston 10 in the first state.

In another example, the second 3D piston model can be compared to a reference model (sometimes referred to as a reference image), which is not directly based upon a scan of the piston in a first state, to identify deposits 32. This embodiment can eliminate the need to perform blocks 310 and 320. The computer system 200 can compare the second 3D piston model to the reference model to identify one or more deposits 32. The differences between the reference model and the second 3D piston model can represent locations and geometry of deposits 32 on the piston. The reference model may be a reference plane such as a three point plane or multiple reference planes. In an example using a two dimensional comparison technique, a desired surface of the 3D piston model can be selected and used in a pixel comparison with the reference plane. The reference model may be a 3D model of a piston having ideal geometry. In an example using a three dimensional comparison technique, the second 3D piston model can be used in a voxel comparison with the 3D model of a piston having ideal geometry.

In an example the scan information from the piston 10 in the second state is compared to the scan information of the piston 10 in the first state or to reference information, related to a desired geometry, to generate measurement data.

At block 360 measurement data for the at least one deposit 32 can be generated. The computer system 200 can generate measurement data for each of identified deposits 32. The measurement data can include the dimensions of the deposits 32, for example width, length, thickness, area, volume, and other dimensions. The measurement data can include the location of each deposit 32, for example the deposit's proximity, position, and orientation to features of the piston 10. For example, if two deposits 32 of the same size and geometry are positioned in low and high interest regions on the same piston 10, it would be beneficial to classify the grading criteria to be more sensitive with respect to the high interest region. In this example, the piston 10 may be graded as acceptable in view of the deposit 32 in the low interest region and the piston 10 may be graded as not acceptable in view of the deposit 32 in the high interest region.

The measurement data can include the position, distance, and orientation of each of the deposits 32 with respect to each of the other deposits 32.

The measurement data can include the total, also referred to as the sum, of the surface areas of each of the deposits 32. The measurement data can include the sum of the areas, with respect to a selected plane, of each of the deposits 32 and can relate to the percent coverage of the deposits 32. The measurement data can include ratios between length, width, and depth of each of the deposits 32.

The measurement data can include the percent coverage of deposits 32 on the first land 25. The measurement data can include the average, maximum, and minimum thickness of deposits 32 on the first land 25.

The measurement data can include the percent coverage of deposits 32 on the second land 26. The measurement data can include the average, maximum, and minimum thickness of deposits 32 on the second land 26.

The measurement data can include the percent coverage of deposits 32 on the third land 33. The measurement data can include the average, maximum, and minimum thickness of deposits 32 on the third land 33.

The measurement data can include the percent coverage of deposits 32 on the fourth land 34. The measurement data can include the average, maximum, and minimum thickness of deposits 32 on the fourth land 34.

The measurement data can include the percent coverage of deposits 32 on the first grove 27. The measurement data can include the average, maximum, and minimum thickness of deposits 32 on the first grove 27.

The measurement data can include the percent coverage of deposits 32 on the second groove 29. The measurement data can include the average, maximum, and minimum thickness of deposits 32 on the second groove 29.

The measurement data can include the percent coverage of deposits 32 on the third groove 31. The measurement data can include the average, maximum, and minimum thickness of deposits 32 on the third groove 31.

In some embodiments the first land 25, the second land 26, the third land 33, the fourth land 44, the first groove 27, the second groove 29, and the third groove 31 can each be divided into octants similar to visual assessment standards. The measurement data can be based on these divided octants. In other embodiments the first land 25, the second land 26, the third land 33, the fourth land 34, the first groove 27, the second groove 29, and the third groove 31 can be divided into any other number of portions.

At block 370 the temperature of the outer surface 28 of the piston 10 can be increased. In other examples the method may include cooling the outer surface 28 of the piston 10. In an example the piston 10 can be heated with a heating element such as a heat gun. In an embodiment the heat is applied to the combustion surface 16. Heat can be applied to the piston 10 until a desired temperature at the outer surface 28 of the piston 10 is reached.

At block 380 a thermal scan can be performed of the outer surface 28 of the piston 10 and any deposits there on with the thermal scanner 250. The piston 10 may be in a dirty or used condition. The thermal scan can be performed by a thermal scanner 250, which may include a computer system 200. The scanning process can measure temperature at a plurality of locations upon the outer surface 28 of the piston 10. In an embodiment, thermal scan data is generated from the thermal scan by the computer system 200 and can represent the temperatures measured on the outer surface 28 of the piston 10 at defined locations. In an example the temperatures are measured at locations oriented in a grid. The thermal scanner 250 can transmit the temperature measurements relating to the piston 10 to the computer system 200. In other words, the computer system 200 receives the thermal scan of the piston 10. In examples multiple scans can be performed and scans can be taken at different angles and rotations.

In an embodiment, at block 390 a thermal image can be generated from the thermal scan of the piston 10. The computer system 200 can generate the thermal image from the thermal scan information, such as temperature measurements, sent from the thermal scanner 250. In an embodiment, the software of the computer system 200 can generate the thermal image from the thermal scan information sent from the thermal scanner 250. In other embodiments the thermal scanner 250 generates the thermal image. The thermal image of the outer surface 28 of the piston 10 can have a visual temperature gradient. The temperature gradient may be a range of colors with associated temperature measurement values. In other words the temperature gradient can visually represent the comparative difference in temperature at different locations on the outer surface 28. In an embodiment the temperature gradient can be limited to a temperature window of approximately 5 degrees Fahrenheit. In other examples the temperature gradient can be limited to a temperature window of 2 degrees or 3 degrees Fahrenheit. In another example the temperature gradient can be limited to a temperature window of less than 2 degrees Fahrenheit. In some embodiments, this block is not performed.

At block 400 deposit locations 32 can be identified from the temperatures at the plurality of locations upon the outer surface 28 of the piston 10 by identifying temperature differences with respect to a temperature of the outer surface 28 of the piston 10. For example as the piston 10 is warmed up and increases in temperature, the temperature of the outer surface 28 of the piston 10 can increase greater than the deposits 32. The thermal image can show these comparatively cold locations based on the difference in temperature recorded by the thermal scanner 250.

In an example deposit 32 locations can be identified from the thermal image by identifying temperature difference with respect to a temperature of the outer surface 28 of the piston 10.

At block 410 deposit characteristics can be generated from the deposit locations and the magnitude of temperature differences with respect to the temperature of the outer surface 28 of the piston 10. Deposits characteristics can include composition, density, geometry, thickness and other characteristics of the deposits. In an example, the magnitude of the temperature difference can indicate the density or composition of the deposit. If the deposit is mostly uniform in density and/or composition, the magnitude of temperature difference can relate to thickness of the deposits.

At block 420 the piston 10 can be graded as acceptable or not acceptable based on, for example, the measurement data and the deposit characteristics. The grading can be performed by the computer system 200. Each of the measurements of the measurements data and the deposit characteristics can have a score associated with them. For example the measured thickness of a deposit 32 can have a score from 1 to 10 and the score may be weighted based on the deposit's location relative to the piston 10. In another example, the deposit characteristics may include deposit density and each measurement data score for each deposit may be weighted based on the deposit density. The scores may be recorded by the computer system 200.

In an example the scores from the measurement data and the deposit characteristics may be totaled for a cumulative score and compared to a score threshold. In other examples individual scores can be compared individually to score thresholds. The score threshold set at a specific value. If the cumulative score exceeds the score threshold, the piston 10 can be graded as not acceptable. If the cumulative score is less than the score threshold, the piston 10 can be graded as acceptable. If the pistons 10 are graded as acceptable, the machinery product development can proceed without requiring adjustments to reduce deposit 32 formation. In an example, the grading can have multiple tiers such as the machinery being graded as no redesign needed, light redesign needed, medium redesign needed, heavy redesign needed, and not acceptable.

In other examples, other algorithms and quantitative comparisons can be executed to grade the pistons 10.

Blocks which do not rely upon a previous block can be performed in various orders. For example blocks 310-360 can be performed after blocks 370-410. Similarly blocks 340-360 can be performed after block 390.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art.

Actions or items may be ordered into a different sequence or may be performed in parallel or dynamically, without departing from the scope of the present application. Similarly, the various process and methods described herein may be described with reference to flow charts having process blocks illustrated in a particular sequence. However, the example implementations are not limited to the particular sequence illustrated. Example implementations may include actions being ordered into a different sequence as may be apparent to a person of ordinary skill in the art or actions may be performed in parallel or dynamically, without departing from the scope of the present application.

What is claimed is:

1. A method of grading a piston with a first land, a second land, a first groove, and an outer surface, the method comprising:
    performing a three dimensional scan of the piston;
    creating a three dimensional piston model from the three dimensional scan of the piston;
    comparing the three dimensional piston model to a reference model to identify one or more deposits;
    generating measurement data for each of the one or more deposits;
    increasing a temperature of the piston;
    performing a thermal scan of the outer surface of the piston and any deposits thereon;
    generating thermal scan data from the thermal scan representing temperatures at a plurality of locations upon the outer surface of the piston;
    identifying deposit locations from the temperatures at the plurality of locations upon the outer surface of the piston by identifying temperature differences with respect to a temperature of the outer surface of the piston;
    generating deposit characteristics from the deposit locations and magnitude of the temperature differences with respect to the temperature of the outer surface of the piston; and
    grading the piston with regard to the measurement data and the deposit characteristics.

2. The method of claim 1, wherein the method further comprises generating the reference model by scanning the piston in a first state.

3. The method of claim 1, wherein the measurement data for each of the one or more deposits includes a maximum thickness of the one or more deposits within the first land.

4. The method of claim 1, wherein the measurement data for each of the one or more deposits includes a maximum thickness of the one or more deposits within the second land.

5. The method of claim 1, wherein the measurement data for each of the one or more deposits includes a maximum thickness of the one or more deposits within the first groove.

6. The method of claim 1, wherein the measurement data for each of the one or more deposits includes a percent coverage of the one or more deposits within the first groove.

7. The method of claim 1, wherein the deposit characteristics include density of the deposits.

8. The method of claim 1, wherein the deposits are carbon based.

9. A method of grading a piston with a first land, a second land, a first groove, an outer surface, and deposits upon the outer surface, the method comprising:
    performing a three dimensional scan of the piston;
    creating a three dimensional piston model from the three dimensional scan of the piston;
    comparing the three dimensional piston model to a reference model to identify one or more deposits;
    generating measurement data for each of the one or more deposits;
    increasing a temperature of the piston;
    generating a thermal image of the outer surface of the piston and any deposits thereon, including a visual temperature gradient;
    identifying deposit locations from the thermal image by identifying temperature differences with respect to a temperature of the outer surface of the piston;
    generating deposit characteristics from the deposit locations and magnitude of the temperature differences with respect to the temperature of the outer surface of the piston; and
    grading the piston with regard to the measurement data and the deposit characteristics.

10. The method of claim 9, wherein the measurement data includes a thickness of the one or more deposits identified.

11. The method of claim 9, wherein the method further comprises generating the reference model by scanning the piston in a first state.

12. The method of claim 9, wherein the measurement data for each of the one or more deposits includes a maximum thickness of the one or more deposits within the first land, the second land, and the first groove.

13. The method of claim 9, wherein the measurement data for each of the one or more deposits includes an average thickness of the one or more deposits within the first land, the second land, and the first groove.

14. The method of claim 9, wherein the measurement data for each of the one or more deposits includes a percent coverage of the one or more deposits within the first land, the second land, and the first groove.

15. The method of claim 9, wherein the deposit characteristics include density of the deposits.

16. A piston grading system comprising:
    at least one processor; and
    a memory storing software that, when executed by the at least one processor causes the processor to,
    receive a three dimensional scan of a piston,
    create a three dimensional piston model from the three dimensional scan of the piston,
    compare the three dimensional piston model to a reference model to identify one or more deposits,
    generate measurement data for the one or more deposits,
    perform a thermal scan of an outer surface of a piston and any deposits thereon,
        generate thermal scan data from the thermal scan representing temperatures at a plurality of locations upon the outer surface of the piston,
        identify deposit locations from the temperatures at the plurality of locations upon the outer surface of the piston by identifying temperature differences with respect to a temperature of the outer surface of the piston,
        generate deposit characteristics from the deposit locations and magnitude of the temperature differences with respect to the temperature of the outer surface of the piston, and
        grade the piston with regard to the measurement data and the deposit characteristics.

17. The piston grading system of claim 16, wherein the measurement data for each of the one or more deposits includes a maximum thickness of the one or more deposits.

18. The piston grading system of claim 16, wherein the measurement data for each of the one or more deposits includes an average thickness of the one or more deposits.

19. The piston grading system of claim 16, wherein the measurement data for each of the one or more deposits includes a percent coverage of the one or more deposits.

20. The piston grading system of claim 16, wherein the deposit characteristics include density of the deposits.

\* \* \* \* \*